United States Patent
Ripley

(10) Patent No.: US 10,208,672 B2
(45) Date of Patent: Feb. 19, 2019

(54) ACCUMULATOR ASSISTED GAS TURBINE ENGINE START SYSTEM AND METHODS THEREFOR

(71) Applicant: UNITED TECHNOLOGIES CORPORATION, Farmington, CT (US)

(72) Inventor: David Lloyd Ripley, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 835 days.

(21) Appl. No.: 14/616,834

(22) Filed: Feb. 9, 2015

(65) Prior Publication Data

US 2016/0230667 A1 Aug. 11, 2016

(51) Int. Cl.
| | |
|---|---|
| F02C 7/22 | (2006.01) |
| F02C 7/26 | (2006.01) |
| F02C 6/14 | (2006.01) |
| F02C 7/232 | (2006.01) |
| F02C 9/28 | (2006.01) |
| F02C 9/40 | (2006.01) |
| F04C 2/10 | (2006.01) |

(52) U.S. Cl.
CPC ............... *F02C 7/22* (2013.01); *F02C 6/14* (2013.01); *F02C 7/232* (2013.01); *F02C 9/28* (2013.01); *F02C 9/40* (2013.01); *F04C 2/10* (2013.01); *F05D 2220/50* (2013.01); *Y02T 50/671* (2013.01)

(58) Field of Classification Search
CPC .. F02C 7/22; F02C 7/232; F02C 7/236; F02C 6/16; F02C 6/14; F02C 9/26; F02C 9/28; F02C 9/40; F04C 2/18; Y02T 50/671; F05C 2220/50

USPC ............... 60/734, 776, 786, 39.091
See application file for complete search history.

(56) References Cited

U.S. PATENT DOCUMENTS

| | | | |
|---|---|---|---|
| 3,332,234 A * | 7/1967 | Lavash | F02C 9/28 60/39.281 |
| 3,878,678 A | 4/1975 | Huellmantel et al. | |
| 4,173,121 A | 11/1979 | Yu | |
| 4,987,737 A * | 1/1991 | Cantwell | F02C 9/28 60/39.281 |
| 5,845,483 A | 12/1998 | Petrowicz | |
| 5,867,979 A | 2/1999 | Newton et al. | |
| 6,968,701 B2 | 11/2005 | Glahn et al. | |

(Continued)

FOREIGN PATENT DOCUMENTS

| | | |
|---|---|---|
| EP | 2554799 | 6/2013 |
| GB | 719996 A | 12/1954 |
| WO | 2014130650 A1 | 8/2014 |

OTHER PUBLICATIONS

European Search Report for Application No. 16154937; dated Jun. 22, 2016.
English Translation to GB719996 Abstract.

*Primary Examiner* — Theresa Trieu
(74) *Attorney, Agent, or Firm* — Cantor Colburn LLP

(57) ABSTRACT

A gas turbine engine assembly is provided having a gas turbine engine and a fuel supply in flow communication with the gas turbine engine. An accumulator is positioned in flow communication between the fuel supply and the gas turbine engine to store fuel pressure in fuel flowing from the fuel supply to the gas turbine engine.

14 Claims, 2 Drawing Sheets

(56) References Cited

U.S. PATENT DOCUMENTS

| | | |
|---|---|---|
| 7,093,447 B2 | 8/2006 | Thompson et al. |
| 7,464,533 B2 | 12/2008 | Wollenweber |
| 7,707,838 B2 | 5/2010 | Sheldon et al. |
| 8,205,429 B2 | 6/2012 | Wollenweber |
| 2006/0266047 A1* | 11/2006 | Eick ........................ F02C 7/236 |
| | | 60/734 |
| 2010/0293919 A1* | 11/2010 | Poisson ..................... F02C 9/28 |
| | | 60/39.281 |

* cited by examiner

ACCUMULATOR ASSISTED GAS TURBINE ENGINE START SYSTEM AND METHODS THEREFOR

TECHNICAL FIELD OF THE DISCLOSED EMBODIMENTS

The present disclosures relate generally to a gas turbine engine and, more particularly, to an accumulator assisted gas turbine engine start system.

BACKGROUND OF THE DISCLOSED EMBODIMENTS

Generally, gas turbine engines require assistance from an auxiliary power unit to start in cold temperatures and/or high altitudes. In a typical application, an aircraft gas turbine engine would utilize a gearbox driven fuel pump to deliver fuel to the engine combustor. Gear driven pumps are typically inefficient at low speed and are unable to deliver high pressurized fuel to the combustor for ignition at very low speed. It is generally recognized that for many gas turbine engine types it is easier to ignite fuel and start successfully at lower speed than at higher speed, therefore the gear driven pump is operated at low speed when starting the engine. Some engines utilize a larger pump to provide more fuel; however, larger pumps are generally oversized at high speed and result in increased weight and costs.

SUMMARY OF THE DISCLOSED EMBODIMENTS

In one aspect, an accumulator assisted gas turbine engine start system for a gas turbine engine including a fuel supply is provided. The system includes an accumulator positioned in flow communication between a fuel supply and the gas turbine engine to store fuel pressure in fuel flowing from the fuel supply to the gas turbine engine.

In a further embodiment of the above, the system also includes a check valve positioned in flow communication between the fuel supply and the accumulator, wherein the check valve limits a loss of pressure in the accumulator.

In a further embodiment of any of the above, the system also includes a shutoff valve positioned in flow communication between the accumulator and the gas turbine engine, wherein the shutoff valve limits a loss of pressure in the accumulator.

In a further embodiment of any of the above, the system also includes a fuel nozzle positioned within the gas turbine engine, wherein the fuel nozzle atomizes high pressure fuel from the accumulator.

In a further embodiment of any of the above, the system also includes a metering valve positioned downstream from the accumulator, wherein a quantity of fuel discharged by the accumulator is controlled by the metering valve.

In a further embodiment of any of the above, the system also includes a differential pressure valve positioned across a gear pump inlet and a gear pump outlet, wherein the differential pressure valve controls a differential pressure across the metering valve.

In a further embodiment of any of the above, the system also includes a pressure sensor positioned downstream from the accumulator, wherein a pressure of the fuel discharged by the accumulator is measured by the pressure sensor.

In a further embodiment of any of the above, the system also includes a gear pump positioned in flow communication between the fuel supply and the accumulator, wherein fuel is delivered from the fuel supply to the accumulator through the gear pump.

In one aspect, a gas turbine engine assembly is provided having a gas turbine engine and a fuel supply in flow communication with the gas turbine engine. An accumulator is positioned in flow communication between the fuel supply and the gas turbine engine to store fuel pressure in fuel flowing from the fuel supply to the gas turbine engine.

In a further embodiment of the above, the gas turbine engine assembly also includes a check valve positioned in flow communication between the fuel supply and the accumulator, wherein the check valve limits a loss of pressure in the accumulator.

In a further embodiment of any of the above, the gas turbine engine assembly also includes a shutoff valve positioned in flow communication between the accumulator and the gas turbine engine, wherein the shutoff valve limits a loss of pressure in the accumulator.

In a further embodiment of any of the above, the gas turbine engine assembly also includes a fuel nozzle positioned within the gas turbine engine, wherein the fuel nozzle atomizes high pressure fuel from accumulator.

In a further embodiment of any of the above, the gas turbine engine assembly also includes a metering valve positioned downstream from the accumulator, wherein a quantity of fuel discharged by the accumulator is controlled by the metering valve.

In a further embodiment of any of the above, the gas turbine engine assembly also includes a differential pressure valve positioned across a gear pump inlet and a gear pump outlet, wherein the differential pressure valve controls a differential pressure across the metering valve.

In a further embodiment of any of the above, the gas turbine engine assembly also includes a pressure sensor positioned downstream from the accumulator, wherein a pressure of the fuel discharged by the accumulator is measured by the pressure sensor.

In a further embodiment of any of the above, the gas turbine engine assembly also includes a gear pump positioned in flow communication between the fuel supply and the accumulator, wherein fuel is delivered from the fuel supply to the accumulator through the gear pump.

In one aspect, a method of controlling a pressure of fuel delivered from a fuel supply to a gas turbine engine is provided. The method includes storing fuel pressure in the fuel flowing from the fuel supply within an accumulator; and supplying fuel to the gas turbine engine from the accumulator.

In a further embodiment of the above, the method also includes limiting a loss of pressure in the accumulator with a check valve check valve positioned in flow communication between the fuel supply and the accumulator.

In a further embodiment of any of the above, the method also includes charging the accumulator with high pressure fuel by running the gas turbine engine.

In a further embodiment of any of the above, the method also includes maintaining a pressure within the accumulator with the check valve and a shutoff valve positioned in flow communication between the accumulator and the gas turbine engine.

BRIEF DESCRIPTION OF THE DRAWINGS

The embodiments and other features, advantages and disclosures contained herein, and the manner of attaining them, will become apparent and the present disclosure will

DETAILED DESCRIPTION OF THE DISCLOSED EMBODIMENTS

Figure 1:
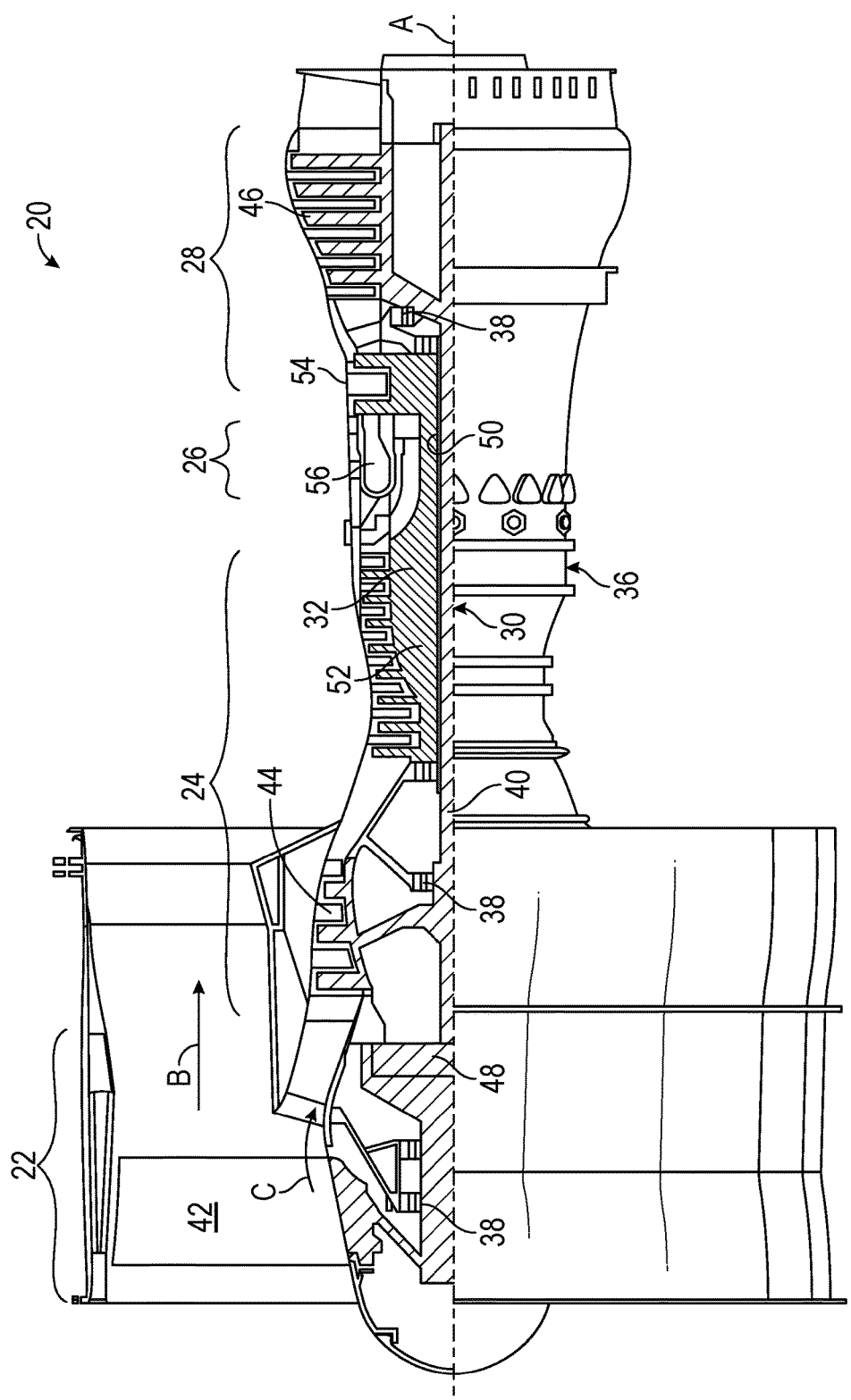
FIG. 1 is a sectional view of a gas turbine engine in an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 m/sec).

Figure 2:
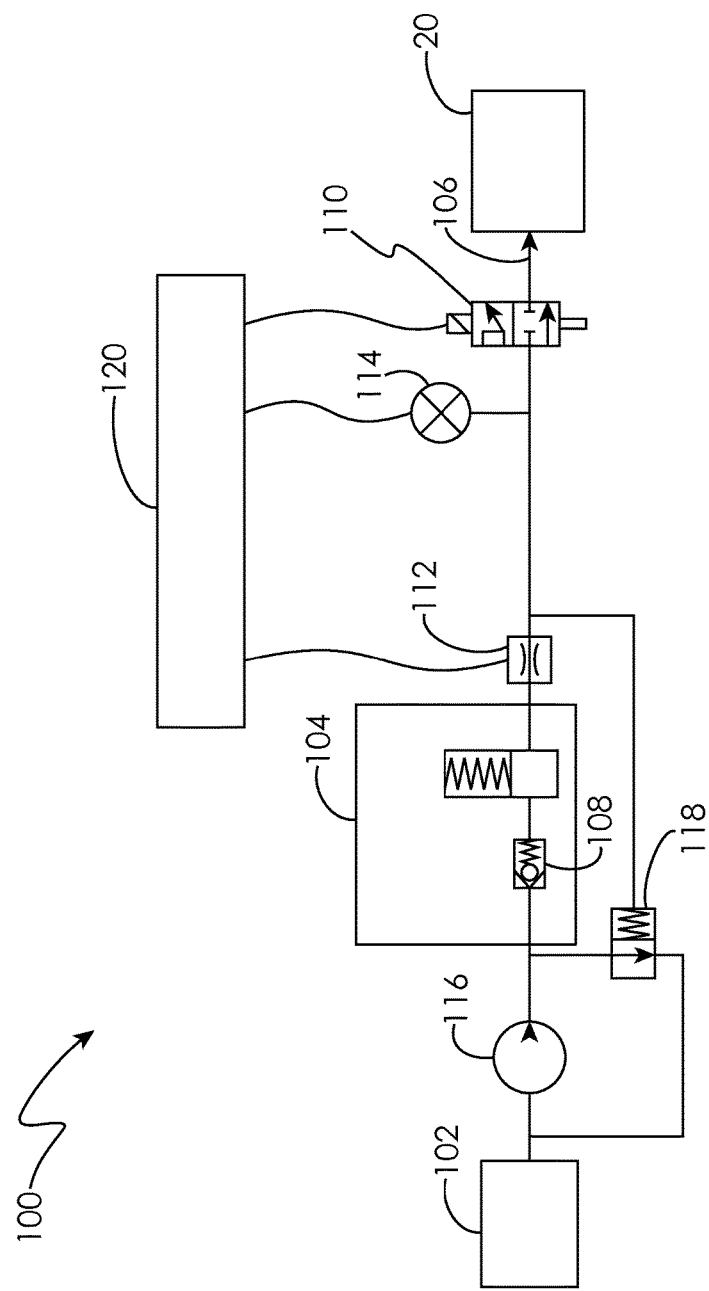
FIG. 2 is a schematic view of an accumulator assisted gas turbine engine start system in an embodiment.

FIG. 2 illustrates an accumulator assisted gas turbine engine start system 100 that includes engine 20. A fuel supply 102 is in flow communication with the engine 20 to deliver fuel to the engine 20. An accumulator 104 is positioned in flow communication between the fuel supply 102 and the engine 20. The accumulator 104 stores fuel pressure in the fuel flowing from the fuel supply 102 to the engine 20. A fuel nozzle 106 ejects the fuel into the engine 20. In one embodiment, the fuel nozzle 106 atomizes the fuel being injected into the engine 20. A gear pump 116 is positioned in flow communication between the fuel supply 102 and the accumulator 104. The gear pump 116 delivers fuel from the fuel supply 102 to the accumulator 104. A check valve 108 is positioned in flow communication between the fuel supply 102 and the accumulator 104. A shutoff valve 110 is positioned in flow communication between the accumulator 104 and the engine 20. In one embodiment, the shutoff valve 110 may be a solenoid valve.

In one embodiment, a metering valve 112 is positioned downstream from the accumulator 104. The metering valve 112 may control a quantity of fuel discharged by the accumulator 104. In one embodiment, a pressure sensor 114 is positioned downstream from the accumulator 104. The pressure sensor 114 may be positioned upstream from the shutoff valve 110. The pressure sensor 114 may be positioned downstream from the metering valve 112. In one embodiment, the pressure sensor 114 measures a pressure of the fuel discharged by the accumulator 104 and flowing to the engine 20. In one embodiment, a differential pressure valve 118 is positioned across the inlet and outlet of the gear pump 116. The differential pressure valve 118 controls the differential pressure across the fuel metering valve 112 so that fuel servo valve metering is linear to the input command from the controller.

In one embodiment, an engine controller 120 is provided to monitor and control the accumulator assisted gas turbine engine start system 100. In one embodiment, the engine controller 120 is electrically coupled to the metering valve 112 to control a position of the metering valve based on the desired quantity of fuel. In one embodiment, the engine controller 120 is electrically coupled to the pressure sensor 114 to monitor the pressure in the fuel. In one embodiment, the engine controller 120 is electrically coupled to the shutoff valve 110 to open and close the shutoff valve 110.

During use, initially the accumulator 104 is unpressurized. The accumulator 104 becomes pressurized by running the engine 20. In one embodiment, the accumulator 104 is charged with high pressure by running the engine 20. The high pressure is stored in the accumulator 104 for subsequent engine 20 startups. In one embodiment, by storing fuel at a relatively high pressure, the fuel is more easily combusted at low temperatures, thereby improving engine 20 start up at low temperatures and high altitudes. The pressure is maintained after shutdown of the engine 20 by the check valve 108 and the shutoff valve 110. The check valve 108 and the shutoff valve 110 maintain the pressure in the accumulator 104 between startups. In one embodiment, the check valve 108 limits a loss of pressure through the inlet of the accumulator 104. In one embodiment, the shutoff valve 110 limits a loss of pressure through the outlet of the accumulator 104. During subsequent starting attempts the accumulator 104 supplements the gear pump 116 with high pressure fuel at low speed thereby decreasing a time for the pressurized fuel to reach the combustor of the engine 20. In one embodiment, the high pressure fuel improves the ability of the engine 20 to start with cold fuel at high altitude. Cold fuel typically is easier to ignite when finely atomized by nozzle injection at high pressure. In an embodiment, high pressure fuel from the accumulator 104 is more finely atomized than low pressure fuel. The more finely atomized fuel improves combustion within the engine 20. In one embodiment, the pressure of the fuel is monitored to determine a level of charge required within the accumulator 104. In one embodiment, the differential pressure valve 118 is opened or closed depending on the pressure downstream from the metering valve 112. For example, if the pressure exceeds a threshold at that location, the differential pressure valve 118 opens and dumps fuel from the gear pump 116 outlet back to the gear pump 116 inlet, thereby reducing the output of the gear pump 116 until the pressure returns to the desired range.

Some of the presently disclosed embodiments provide a system and method to improve cold, high altitude gas turbine engine start capability. Additionally, some of the presently disclosed embodiments reduce, and may eliminate, a need for an auxiliary start fuel pump. Also, some of the presently disclosed embodiments do not require additional power or signal wires. Some of the presently disclosed embodiments also provide a method to verify that the accumulator 104 is functioning during every start attempt (i.e. prevent latent failure mode). In one embodiment, if the accumulator 104 is charged, the pressure sensor 114 will show, after the shutoff valve 110 is opened, a higher initial fuel pressure with a charged accumulator 104 than with an uncharged accumulator.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An accumulator assisted gas turbine engine start system for a gas turbine engine including a fuel supply, the system comprising:
   an accumulator positioned in flow communication between the fuel supply and the gas turbine engine configured to store fuel pressure in fuel flowing from the fuel supply to the gas turbine engine;
   a gear pump positioned in flow communication between the fuel supply and the accumulator, wherein fuel is delivered from the fuel supply to the accumulator through the gear pump; and
   a check valve positioned in flow communication between the fuel supply and the accumulator, wherein the check valve limits a loss of pressure in the accumulator when the gas turbine engine and gear pump are inactive.

2. The system of claim 1, further comprising a shutoff valve positioned in flow communication between the accumulator and the gas turbine engine, wherein the shutoff valve limits a loss of pressure in the accumulator.

3. The system of claim 1, further comprising a fuel nozzle positioned within the gas turbine engine, wherein the fuel nozzle atomizes high pressure fuel from the accumulator.

4. The system of claim 1, further comprising a metering valve positioned downstream from the accumulator, wherein a quantity of fuel discharged by the accumulator is controlled by the metering valve.

5. The system of claim 4, further comprising a differential pressure valve positioned across the gear pump, wherein the differential pressure valve controls a differential pressure across the metering valve.

6. The system of claim 1, further comprising a pressure sensor positioned downstream from the accumulator, wherein a pressure of the fuel discharged by the accumulator is measured by the pressure sensor.

7. A gas turbine engine assembly comprising:
   a gas turbine engine;
   a fuel supply in flow communication with the gas turbine engine; and
   an accumulator positioned in flow communication between the fuel supply and the gas turbine engine to store fuel pressure in fuel flowing from the fuel supply to the gas turbine engine;
   a gear pump positioned in flow communication between the fuel supply and the accumulator, wherein fuel is delivered from the fuel supply to the accumulator through the gear pump; and a check valve positioned in flow communication between the fuel supply and the accumulator, wherein the check valve limits a loss of pressure in the accumulator when the gas turbine engine and gear pump are inactive.

8. The assembly of claim 7, further comprising a shutoff valve positioned in flow communication between the accumulator and the gas turbine engine, wherein the shutoff valve limits a loss of pressure in the accumulator.

9. The assembly of claim 7, further comprising a fuel nozzle positioned within the gas turbine engine, wherein the fuel nozzle atomizes high pressure fuel from accumulator.

10. The assembly of claim 7, further comprising a metering valve positioned downstream from the accumulator, wherein a quantity of fuel discharged by the accumulator is controlled by the metering valve.

11. The assembly of claim 10, further comprising a differential pressure valve positioned across the gear pump, wherein the differential pressure valve controls a differential pressure across the metering valve.

12. The assembly of claim 7, further comprising a pressure sensor positioned downstream from the accumulator, wherein a pressure of the fuel discharged by the accumulator is measured by the pressure sensor.

13. A method of controlling a pressure of fuel delivered from a fuel supply to a gas turbine engine comprising:

storing fuel pressure in the fuel flowing from the fuel supply within an accumulator;

charging the accumulator with high pressure fuel by running the gas turbine engine;

supplying fuel to the gas turbine engine from the accumulator; and limiting a loss of pressure in the accumulator with a check valve positioned in flow communication between the fuel supply and the accumulator when the gas turbine engine is inactive.

14. The method of claim 13 further comprising maintaining a pressure within the accumulator with the check valve and a shutoff valve positioned in flow communication between the accumulator and the gas turbine engine.

* * * * *